May 20, 1930.    L. L. LOMAR    1,759,266
SNUBBER
Filed Jan. 17, 1925    2 Sheets-Sheet 1
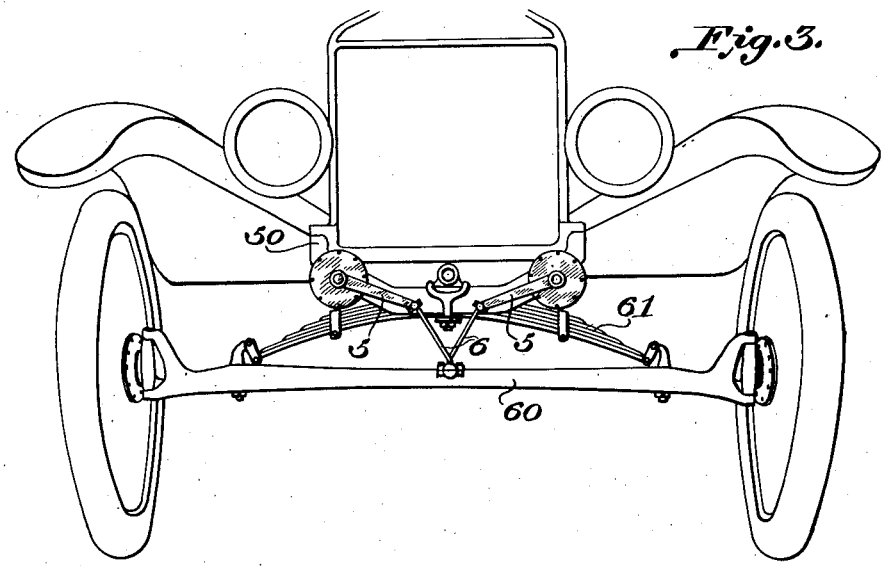
Fig. 3.
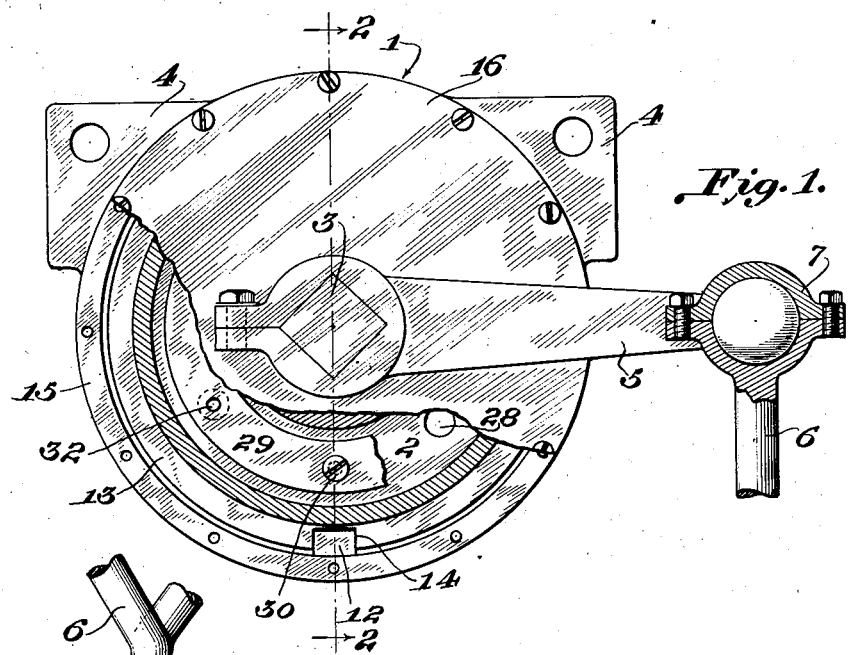
Fig. 1.
Fig. 4.
Inventor
Louis L. Lomar.
By J. W. Milburn
Attorney May 20, 1930.                    L. L. LOMAR                 1,759,266
                                   SNUBBER
                         Filed Jan. 17, 1925     2 Sheets-Sheet 2
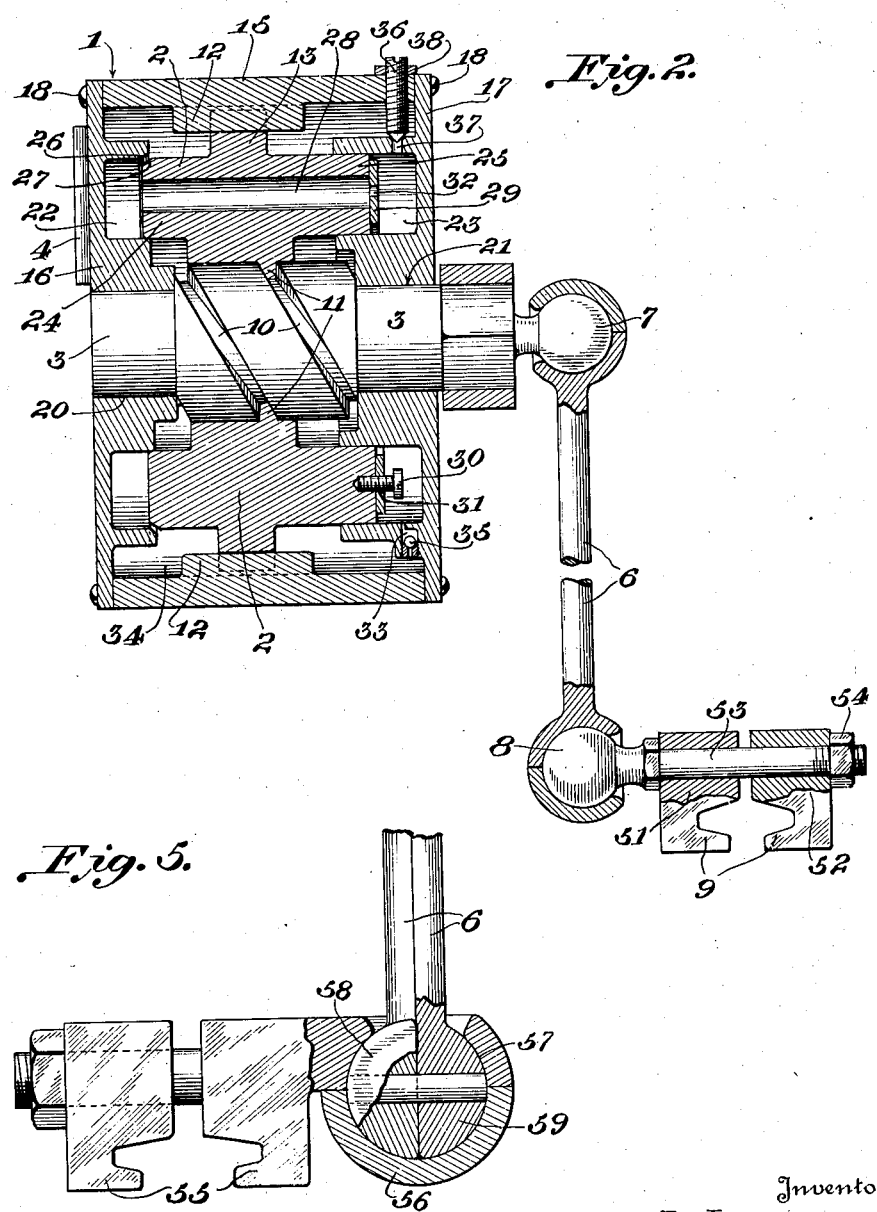
Inventor
Louis L. Lomar
By J. W. Milburn
Attorney Patented May 20, 1930

1,759,266

UNITED STATES PATENT OFFICE

LOUIS L. LOMAR, OF HOUSTON, TEXAS

SNUBBER

Application filed January 17, 1925. Serial No. 3,068.

The invention relates to snubbers and particularly to devices of that character in which snubbing action is effected by the cushioning action of an enclosed fluid upon a piston.

The invention is applicable to vehicles and other structures in the operation of which cushioning of the action of relatively movable parts may be desirable.
As applied to motor vehicles the invention is designed and intended to cushion both the shock and the rebound experienced when the wheels of the vehicle encounter uneven or rough surfaces.
One of the principal objects of my invention is the provision of a device which exerts its cushioning action gradually by automatically applying increased resistance to continued relative movement between the parts to which the device is connected.

A further object of the invention is the provision of a snubber of practical construction in which a rotatable member actuated by relative movement of the parts to which the device is connected acts upon and imparts linear motion to a piston against the resistance of a body of fluid, the construction of the piston and its relation to the other parts of the device being such that the fluid will, in a novel and efficient manner, present the proper degree of resistance to the piston throughout its movement.

Another object of the invention is the provision of a snubber of compact form which may be applied to an automobile quickly and conveniently and will produce more effective snubbing action.

A still further object is the provision of an improved arrangement of snubbing devices and their operating connections and improved means for operatively applying such devices to an automobile.

With these and other objects in view, the invention consists in certain novel features of construction, arrangement and operation of parts described in this specification and illustrated in the accompanying drawings, wherein:—

Figure 1 is an end elevational view of the device with parts broken away,

Figure 2 is a cross-sectional view taken on line 2—2 of Fig. 1,

Figure 3 is a front elevational view of a Ford automobile illustrating a novel manner of applying a pair of my devices thereto, and Figures 4 and 5 are detail views of the clamp construction illustrated in Fig. 3 for attaching the operating connections of the pair of snubber devices to the axle of the automobile.

The drawings illustrate an embodiment of my invention which is especially adapted for use upon a motor vehicle. In the form shown the device comprises a closed casing 1 adapted to contain oil or other liquid or fluid cushioning medium, a reciprocable piston 2 within the casing, a rotatable shaft 3 journalled in the casing, and operatively connected to the piston, and means for operating the rotatable shaft. The casing and the shaft-operating means are adapted and intended to be connected to relatively movable parts of the vehicle. In the arrangement depicted the casing 1 is secured by bracket 4 to the chassis frame 50, while the shaft 3 is pivotally connected to the axle 60 through an arm 5 keyed to the shaft and a link 6 connected to arm 5 and to a clamp member fastened to the axle.

Figure 2 shows one form of connecting means which may be used for attaching the shaft 3 to the axle 60. A separate adjustable clamp 9 is employed for each device, this clamp, as illustrated, comprising opposed clamp members 51, 52, carried by a bolt 53 with a nut 54 upon one end. The opposite end of the bolt is connected by a ball and socket joint 8 with link 6, which in turn is connected by a similar ball and socket joint 7 with the outer end of arm 5.

The form of connection illustrated in Fig. 2 is intended especially for use in installations in which the operating connections of a pair of snubbers are respectively attached to the axle of the vehicle near its ends. The clamps 9 may be secured to the axle, however, at any desired point or points, and both clamps may be secured to the axle at or near its center.

Figure 3 shows a construction and arrangement of operating connections by which a pair of snubbers are operatively connected to the axle of the vehicle at a common point, the arrangement being especially adapted for the installation of my snubber devices upon a Ford car. As shown in Figs. 3, 4 and 5, the connecting links 6, 6, of the two snubbers are combined into a single ball and socket joint at the axle, thus providing the three point suspension between the automobile frame and the axle which is desirable on Ford cars. The clamp member 55 employed for attachment to the axle may be of the same general form as clamp 9, but is provided with a removable plate 56 which, with the clamp member, forms a socket 57 adapted to receive the hemispherical ends 58, 59, of a pair of links 6. The resultant ball and socket joint forms a pivotal connection at the same point on the axle between the axle and the rotatable shafts 3, 3 of the pair of snubbers. This means of installation affords the necessary connection of the devices to the axle to permit the full action of the vehicle spring 61, while at the same time cushioning relative movement of the axle and chassis frame and preventing sidesway of the car.

The construction of the snubber and its working parts is clearly shown in Figs. 1 and 2. The shaft 3 and piston 2 are operatively connected in such manner as to cause the rotation or oscillation of the shaft to reciprocate the piston. To this end the shaft, for a portion of its length, is enlarged and provided with a screw-thread 10 adapted to be engaged by a corresponding screw-thread 11 or other suitable projection on the piston. The gear connection thus provided advances the piston linearly in one direction or the other upon the turning of the shaft and prevents the passage of fluid through the connection from one side of the piston to the other.

Rotation of the piston in the casing in response to the rotative movement of the shaft is prevented by means of a lug or boss 12 on the casing positioned to engage a projection on the piston. The boss 12 is preferably arranged to seat in a slot 14 in an annular flange 13 formed on or secured to the piston 2 and is of such length as to constitute a guide for the piston and an effective seal for the fluid in the casing throughout the entire piston movement.

The casing 1 may be of any desired shape or size, and its interior construction may be varied as may be desirable or convenient, following the general plan and conception of my invention. In its preferred form the casing comprises a main fluid chamber and supplemental fluid chambers, the main chamber in effect being divided by the piston reciprocably mounted therein and the supplemental chambers forming opposed piston chambers in which the piston is adapted to operate. The casing, for convenience in manufacture and assembly, is constructed of a shell 15, preferably cylindrical, and end plates 16 and 17 adapted to fit tightly upon the shell and to be secured thereto by screws 18 or other suitable fastening means. Each end plate has an opening 20, 21, to provide a bearing for the shaft 3, and an open-ended chamber of such size and shape as to closely receive one end of the piston 2.

These piston chambers 22 and 23, respectively, are preferably made of annular shape to fit annular projections 24 and 25 on the respective ends of the piston. The piston chamber 22 is relatively shallow, to permit the piston to reciprocate in and out of the chamber, and a portion of the edges of the chamber walls and the piston are beveled, as at 26 and 27, respectively, to facilitate entry of the piston into the chamber and to provide for a gradual closing of the port formed by the open end of the piston chamber.

The piston chamber 23 is of sufficient depth to slidably receive the piston end 25 throughout the entire stroke of the piston.

In order that the cushioning fluid may pass gradually from one piston chamber to the other during operation of the piston, the latter is provided with one or more conduits 28 extending through the piston and forming a communicating passage or passages between the piston chambers. Regulation of the action of the piston is provided by controlling the amount of resistance to its movement in the piston chambers, this being effected by restricting the passage of fluid through conduit 28 at certain stages of piston movement by means of a valve associated with each conduit 28. This valve may be in the form of an annular plate 29 loosely secured to the piston by pins 30 passing through apertures 31 in the plate. The valve plate 29 is provided with an opening 32 registering with each conduit 28 to permit restricted passage of fluid when the plate is in position to close the conduit.

In the operation of the piston a portion of the oil in chamber 22 is forced into the main chamber 34 through the opening between the beveled parts 26 and 27 and does not enter chamber 23 through conduit 28. In order to insure an adequate supply of oil in piston chamber 23 at all times the latter is connected by a small passage 33 with the main chamber 34, a check valve 35 permitting oil to flow from chamber 34 into chamber 23, but preventing escape of oil from chamber 23.

Variation in the degree of snubbing action of the device may be obtained by adjustment of a needle valve 36 screw-threaded through the wall of the casing shell 15 and adapted to seat in an opening 37 in the wall of the piston chamber 23. The valve 36 may be secured in adjusted position by a lock nut 38.

In the operation of the device, when the automobile wheels encounter an elevation or bump in the road the axle is forced upwardly, carrying with it link 6 and thus raising the outer end of arm 5 and rotating shaft 3 in a counter-clockwise direction. This rotary movement of the shaft is transmitted to the piston 2, and, through the gear connection 10, 11, is translated to linear movement, the resultant effect being to move the piston to the left (in Fig. 2). The initial part of the movement of the piston from its central or neutral position is relatively free, its movement being then impeded only by the resistance of the oil in the main chamber 34. As the piston continues to move to the left the end 24 of the piston approaches and enters the piston chamber 22, the piston closing the open mouth of the chamber and preventing escape of fluid from that chamber except through conduit or conduits 28, the oil in chamber 22 thus cushioning the stroke of the piston in that direction. The application of this cushioning action is performed in a gradual manner, the closure of the mouth of chamber 22 being gradual by reason of the seepage of oil between the beveled portions of the piston and chamber wall, as shown at 27 and 26, until the piston has fully entered and completely closed the mouth of the chamber.

The range of neutral travel of the piston is provided in order that the vehicle spring may be allowed a certain amount of action before the snubber device is brought into operation. While the piston is in its neutral travel there is no appreciable force exerted against the piston, the opening between the beveled edges 26 and 27 being sufficiently large to permit oil to escape from chamber 22 without back pressure against the piston.

If the shock is sufficiently great to move the piston beyond this point, its continued movement toward the left, after the mouth of chamber 22 is fully closed, will be opposed by the oil in chamber 22, which oil the piston will tend to force out of the chamber. This action, also, is a gradual one, being resisted by the restriction placed upon the escape of the oil, which can pass from chamber 22 only through the conduit or conduits 28. Through the movement of the piston toward the left the oil in chamber 22 is forced through the conduit or conduits and opens the valve at the end of the conduit by displacing the valve plate 29. As but a limited quantity of oil can pass through the conduits from chamber 22 to chamber 23, resistance is thus offered to the movement of the piston and the upward action of the axle is checked and the shock gradually absorbed.

As the upward movement of the axle ceases, the vehicle spring, compressed by the shock, sets up a rebound action, which is taken up and cushioned by the snubber device in a manner which will now be described. Referring to Figs. 1 and 2, it will be seen that when the rebound occurs the movement of the link 6 and arm 5 rotates the shaft in a clockwise direction and causes the piston to move to the right. This movement immediately exerts a pressure in chamber 23 and forces the valve plate 29 against the piston end 25, closing conduit or conduits 28. In the usual manner of operation of the device opening 37 will be closed by the needle-valve 36 and the only outlet for oil from chamber 23 will be through openings 32 in the valve-plate 29. Hence, the piston can move into chamber 23 only as fast as it can force the oil out of the chamber through openings 32 into conduits 28 and thence into the main chamber 34. The retarding action thus exerted upon the piston effectively cushions the action of the rebound.

When the device is in operation oil is at all times being forced through the conduit or conduits 28 and openings 32, irrespective of the speed of action, and there is, in consequence, a continual control pressure upon the ends of the piston. This pressure is dependent upon and determined by the size of the fluid passage afforded by conduits 28 and openings 32. At times, particularly in cold weather, it may be found advantageous to provide a by-pass from the piston chamber 23 into the main chamber 34. The opening 37, controlled by needle-valve 36, may be used for this purpose. Under ordinary conditions, however, this by-pass need not be used and the valve 36 may be adjusted to close the opening 37 entirely.

I claim:—

1. In a device of the character described, a casing adapted to contain a fluid, a shaft rotatably mounted in said casing, said shaft and said casing being adapted to be connected to relatively movable parts of a vehicle, said casing having a main fluid chamber and opposed piston chambers open at one end to said main chamber, a piston slidable on said shaft and reciprocable in the open ends of said piston chambers, and a screw and nut connection between said shaft and said piston, said piston having a conduit extending entirely therethrough and closed except at the opposite ends of said piston, said conduit being adapted to form a communicating passage between said piston chambers.

2. In a device of the character described, a casing adapted to contain a fluid, a shaft rotatably mounted in said casing, said shaft and said casing being adapted to be connected to relatively movable parts of a vehicle, said casing having a main fluid chamber and opposed piston chambers open to said main chamber, a piston reciprocably mounted on said shaft and adapted to close said piston chambers, means for preventing relative rotary movement between said piston and said casing, and a screw and nut connection between said piston and said shaft for reciprocating said piston, said piston having a conduit therethrough forming a passage for fluid between said piston chambers.

3. In a device of the character described, a casing adapted to contain a fluid, a shaft rotatably mounted in said casing, said shaft and said casing being adapted to be connected to relatively movable parts of a vehicle, said casing having a main fluid chamber and opposed piston chambers, a piston reciprocable in said main chamber and said piston chambers, a screw and nut connection between said shaft and said piston, said piston having a conduit therethrough adapted to form a communicating passage between said piston chambers, and a valve controlling said conduit and arranged to open when the piston is moving in one direction and to close when the piston moves in the opposite direction, said valve having a restricted aperture for passage of fluid through the conduit when the valve is in closed position.

4. In a device of the character described, a casing adapted to contain a fluid, a shaft rotatably mounted in said casing, said shaft and said casing being adapted to be connected to relatively movable parts of a vehicle, said casing having a main fluid chamber and opposed piston chambers open to said main chamber, a piston in said main chamber adapted to reciprocate in and close said piston chambers, and a screw and nut connection between said shaft and said piston, said piston having a valve-controlled passage therethrough for fluid extending therethrough and of less diameter than said piston chambers.

5. In a device of the character described, a casing adapted to contain a fluid, a shaft rotatably mounted in said casing, said shaft and said casing being adapted to be connected to relatively movable parts of a vehicle, said casing having a main fluid chamber and opposed piston chambers open to said main chamber, a piston reciprocable within said main chamber and having its ends working in and closing said piston chambers, and a screw and nut connection between said shaft and said piston, said piston being provided with a valve-controlled conduit through it adapted to permit restricted passage of fluid between said piston chambers during movement of the piston in one direction and increasedly restricted passage of fluid during movement of the piston in the opposite direction.

6. In a device of the character described, a casing adapted to contain a fluid, a shaft rotatably mounted in said casing, said shaft and said casing being adapted to be connected to relatively movable parts of a vehicle, said casing having a main fluid chamber and opposed annular piston chambers open to said main chamber, an annular piston reciprocably mounted on said shaft and having its ends working in and closing said piston chambers, and a screw and nut connection between said shaft and said piston, said piston having a valve-controlled conduit adapted to form a communicating passage between said piston chambers.

7. In a device of the character described, a casing adapted to contain a fluid, a shaft rotatably mounted in said casing, said shaft and said casing being adapted to be connected to relatively movable parts of a vehicle, said casing having a main fluid chamber and opposed piston chambers open to said main chamber, a piston reciprocable within said main chamber and having its ends working in and closing said piston chambers, and a screw and nut connection between said shaft and said piston, said piston being provided with a conduit therethrough forming a passage for fluid from one side of the piston to the other, one end of said piston being reciprocable out of its piston chamber, the other end of the piston being provided with a valve controlling said conduit, whereby passage of fluid between said piston chambers will be restricted during movement of the piston in one direction and increasingly restricted during movement of the piston in the opposite direction.

8. In a device of the character described, a casing adapted to contain a fluid, a shaft rotatably mounted in said casing, said shaft and said casing being adapted to be connected to relatively movable parts of a vehicle, said casing having a main fluid chamber and opposed piston chambers open to said main chamber, a piston reciprocable within said main chamber and having its ends working in said piston chambers, one of said piston chambers being constantly closed by said piston and the other piston chamber being adapted to be opened and closed by said piston, an operative connection between said shaft and said piston for reciprocating said piston, said piston being provided with a conduit forming a passage for fluid therethrough, a valve on the end of the conduit within said constantly closed piston chamber, said last-mentioned chamber being provided with a valve-controlled port communicating with said main fluid chamber.

9. In a device of the character described, a casing adapted to contain a fluid, a shaft rotatably mounted in said casing, said shaft and said casing being adapted to be connected to relatively movable parts of a vehicle, said casing having a main fluid chamber and a piston chamber having an opening to said main chamber, a piston in said main chamber slidable on said shaft and reciprocable in said opening, and an operative connection between said shaft and said piston for reciprocating said piston, said piston having a conduit therethrough opening at one end in said piston chamber.

10. In a device of the character described, a casing adapted to contain a fluid, a shaft rotatably mounted in said casing, said shaft and said casing being adapted to be connected to relatively movable parts of a vehicle, said casing having a main fluid chamber and a piston chamber having an opening to said main chamber, a piston in said main chamber slidable on said shaft and reciprocable in said opening, an operative connection between said shaft and said piston for reciprocating said piston, said piston having a conduit therethrough opening at one end in said piston chamber, and a valve controlling said conduit.

11. In a device of the character described, a casing adapted to contain a fluid, a shaft rotatably mounted in said casing, said shaft and said casing being adapted to be connected to relatively movable parts of a vehicle, said casing having a main fluid chamber and a piston chamber open at one end to said main chamber and provided with a restricted by-pass to said main chamber, a piston slidable on said shaft and reciprocable in the open end of said piston chamber, and an operative connection between said shaft and said piston for reciprocating said piston, said piston having a conduit therethrough opening at one end in said piston chamber.

12. In a device of the character described, a casing adapted to contain a fluid, a shaft rotatably mounted in said casing, said shaft and said casing being adapted to be connected to relatively movable parts of a vehicle, said casing having a main fluid chamber and a piston chamber at each end thereof, the inner end of each piston chamber being open to said main chamber, a piston reciprocable in the open ends of said piston chambers to close communication between said piston chambers and said main chamber, and a screw and nut connection between said shaft and said piston, to reciprocate said piston, said piston having a conduit adapted to form a communicating passage between said piston chambers.

13. In a device of the character described, a casing adapted to contain a fluid, a shaft rotatably mounted in said casing, said shaft and said casing being adapted to be connected to relatively movable parts of a vehicle, said casing having a main fluid chamber and walls at each end thereof projecting into said main chamber forming open-ended piston chambers, a piston reciprocable in the open ends of said piston chambers to close communication between said piston chambers and said main chamber, a screw and nut connection between said shaft and said piston, said piston having a valved conduit adapted to form a communicating passage between said piston chambers, one of said piston chambers having a relief aperture in its wall providing restricted communication with said main chamber.

14. In a device of the character described, a casing adapted to contain a fluid, a shaft rotatably mounted in said casing, said shaft and said casing being adapted to be connected to relatively movable parts of a vehicle, said casing having a main fluid chamber and opposed piston chambers open to said main chamber, a piston reciprocable within said main chamber and having its ends working in said piston chambers, one of said piston chambers being constantly closed by said piston and the other piston chamber being adapted to be opened and closed by said piston, an operative connection between said shaft and said piston to reciprocate the latter, said piston having a conduit therethrough adapted to form a passage for fluid from one piston chamber to the other piston chamber or to the main fluid chamber.

15. In a device of the character described, a casing adapted to contain a fluid, a shaft rotatably mounted in said casing, said shaft and said casing being adapted to be connected to relatively movable parts of a vehicle, said casing having a main fluid chamber and opposed piston chambers open to said main chamber, a piston reciprocable within said main chamber and having its ends working in said piston chambers, one of said piston chambers being constantly closed by said piston and the other piston chamber being adapted to be opened and closed by said piston, the engagement between said piston and said other piston chamber permitting restricted passage of fluid between said main chamber and said other piston chamber during a part of the piston movement, an operative connection between said shaft and said piston to reciprocate the latter, said piston having a conduit therethrough adapted to form a passage for fluid, and a check valve in said conduit.

16. In a device of the character described, a casing adapted to contain a fluid, said casing having a main fluid chamber and opposed piston chambers open to said main chamber, a piston reciprocable in said chambers to close said piston chambers, said piston having an aperture, a shaft rotatably mounted in said casing and extending through said piston aperture, an operative connection between said shaft and said piston for reciprocating said piston, said piston having a conduit adapted to form a communicating passage between said piston chambers, and a valve controlling said conduit and adapted to restrict the passage of fluid through said conduit to a greater degree during movement of said piston in one direction than during movement of the piston in the opposite direction, said shaft and said casing being adapted to be connected to relatively movable parts of a vehicle.

17. In a device of the character described, a casing adapted to contain a fluid, a shaft rotatably mounted in said casing, said shaft and said casing being adapted to be connected to relatively movable parts of a vehicle, said casing having a main fluid chamber and a piston chamber having an opening to said main chamber, a piston in said main chamber concentrically mounted on said shaft and reciprocable in said opening, and an operative connection between said shaft and said piston for reciprocating said piston, said piston having a conduit therethrough opening at one end in said piston chamber.

18. In a device of the character described, a casing adapted to contain a fluid, a shaft rotatably mounted in said casing, said shaft and said casing being adapted to be connected to relatively movable parts of a vehicle, said casing having a main fluid chamber and opposed piston chambers open at one end to said main chamber, a piston concentrically mounted on said shaft and reciprocable in the open ends of said piston chambers, and an operative connection between said shaft and said piston, said piston having a conduit therethrough adapted to form a communicating passage between said piston chambers.

19. In a device of the character described, a casing adapted to contain a fluid, a shaft rotatably mounted in said casing, said shaft and said casing being adapted to be connected to relatively movable parts of a vehicle, said casing having a main fluid chamber and opposed piston chambers open to said main chamber, a piston reciprocable on said shaft and adapted to close said piston chambers, and an operative connection between said piston and said shaft for reciprocating said piston, said piston having a conduit therethrough forming a passage for fluid between said piston chambers.

20. In a device of the character described, a casing adapted to contain a fluid, a shaft rotatably mounted in said casing, said shaft and said casing being adapted to be connected to relatively movable parts of a vehicle, said casing having a main fluid chamber and opposed annular piston chambers open to said main chamber, an annular piston reciprocably mounted on said shaft and adapted to close said piston chambers, and an operative connection between said shaft and said piston for reciprocating said piston, said piston having a conduit adapted to form a communicating passage between said piston chambers.

21. In a device of the character described, a casing adapted to contain a fluid, a shaft rotatably mounted in said casing, said shaft and said casing being adapted to be connected to relatively movable parts of a vehicle, said casing having a main fluid chamber and a pair of annular piston chambers open to said main chamber, a piston slidable on said shaft and provided with annular heads adapted to work in said piston chambers, one of said piston chambers being constantly closed and the other piston chamber being adapted to be opened and closed by said piston heads, and an operative connection between said shaft and said piston to reciprocate said piston, said piston having a conduit adapted to form a passage for fluid from one piston chamber to the other.

LOUIS L. LOMAR.